(12) United States Patent
Matsuo

(10) Patent No.: US 11,586,396 B1
(45) Date of Patent: Feb. 21, 2023

(54) PRODUCTION PRINTING SYSTEM, SERVER, AND VARIABLE PRINTING METHOD CAPABLE OF VARIABLE PRINTING FOR SPECIFYING PRINTING, POST-PROCESSING, AND OUTPUT DESTINATION

(71) Applicant: KYOCERA Document Solutions Inc., Osaka (JP)

(72) Inventor: Taku Matsuo, Los Angeles, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/561,140

(22) Filed: Dec. 23, 2021

(51) Int. Cl.
*G06F 3/12* (2006.01)

(52) U.S. Cl.
CPC .......... *G06F 3/1205* (2013.01); *G06F 3/1206* (2013.01); *G06F 3/1243* (2013.01); *G06F 3/1264* (2013.01)

(58) Field of Classification Search
None
See application file for complete search history.

(56) References Cited

U.S. PATENT DOCUMENTS

| | | | |
|---|---|---|---|
| 2012/0218590 A1* | 8/2012 | Dumitrescu | G06Q 10/103 358/1.15 |
| 2020/0128135 A1* | 4/2020 | Matsushita | G06F 3/1208 |

FOREIGN PATENT DOCUMENTS

| | | | | |
|---|---|---|---|---|
| JP | 2006293755 A | * | 10/2006 | ........... G06F 3/1204 |
| JP | 2010-277217 A | | 12/2010 | |

OTHER PUBLICATIONS

Translation of JP 2006-293755 (Year: 2005).*

* cited by examiner

*Primary Examiner* — Lennin R Rodriguezgonzalez
(74) *Attorney, Agent, or Firm* — Hawaii Patent Services; Nathaniel K. Fedde; Kenton N. Fedde

(57) ABSTRACT

Provided is a production printing system for production printing capable of variable printing for specifying printing, post-processing, and an output destination. The production printing system process variable data for production printing. The variable document creation unit creates a variable document in which condition is set for each record. The job ticket creation unit creates a job ticket that specifies pre-press, printing, post-processing, and output destination according to the condition set for each the record of the variable document created by the variable document creation unit. The variable processing unit performs processing by using the job ticket created by the job ticket creation unit.

15 Claims, 7 Drawing Sheets

PRODUCTION PRINTING SYSTEM, SERVER, AND VARIABLE PRINTING METHOD CAPABLE OF VARIABLE PRINTING FOR SPECIFYING PRINTING, POST-PROCESSING, AND OUTPUT DESTINATION

BACKGROUND

The present disclosure relates specifically to a production printing system, a server, and a variable printing method.

In industrial printing, which is called production printing by using commercial (industrial) printing equipment, the components of the final product are manufactured by dividing the work into multiple processes. For example, in the case of bookbinding, a cover, a body (color), a body (black and white), a promotional material, a band, a shipping envelope, and the like, are processed as different jobs, respectively. Then, in the middle of the process, each job is combined and finished as a final product, a book.

On the other hand, there is a variable printing technology that prints differently for each record in the database by using a common form, or the like.

As a typical variable printing technology, a print control program and a variable printing system capable of easily setting an output form for each record on the apparatus side instructing variable printing are described. In this technology, image layout information that associates each record with an image to be printed is generated based on a database in which a plurality of records is described. In addition, the apparatus information in which the print setting condition of the apparatus that executes variable printing are described is acquired. Then, based on the information set by using the database and the apparatus information, the print setting information that associates each record with the print setting condition is generated. It also outputs image layout information and print setting information.

SUMMARY

A production printing system according to the present disclosure is a production printing system that processes variable data for production printing, including: a variable document creation unit that creates a variable document with a condition set for each record; a job ticket creation unit that creates a job ticket where prepress, printing, post-processing, and output destination is specified according to the condition set for each the record of the variable document created by the variable document creation unit; and a variable processing unit that performs processing by the job ticket created by the job ticket creation unit.

A server according to the present disclosure is a server of a production printing system that processes variable data for production printing, including: a variable document creation unit that creates a variable document with a condition set for each record; a job ticket creation unit that creates a job ticket where prepress, printing, post-processing, and output destination is specified according to the condition set for each the record of the variable document created by the variable document creation unit; and a variable processing unit that performs processing by the job ticket created by the job ticket creation unit.

A variable printing method of the present disclosure is a variable printing method performed by a server of a production printing system that processes variable data for production printing, including the steps of: creating a variable document with a condition set for each record; creating a job ticket where prepress, printing, post-processing, and output destination is specified according to the condition set for each the record of created variable document; and processing the job by the job ticket that is created.

DETAILED DESCRIPTION

Embodiment

[Configuration of Production Printing System X]

Figure 1:
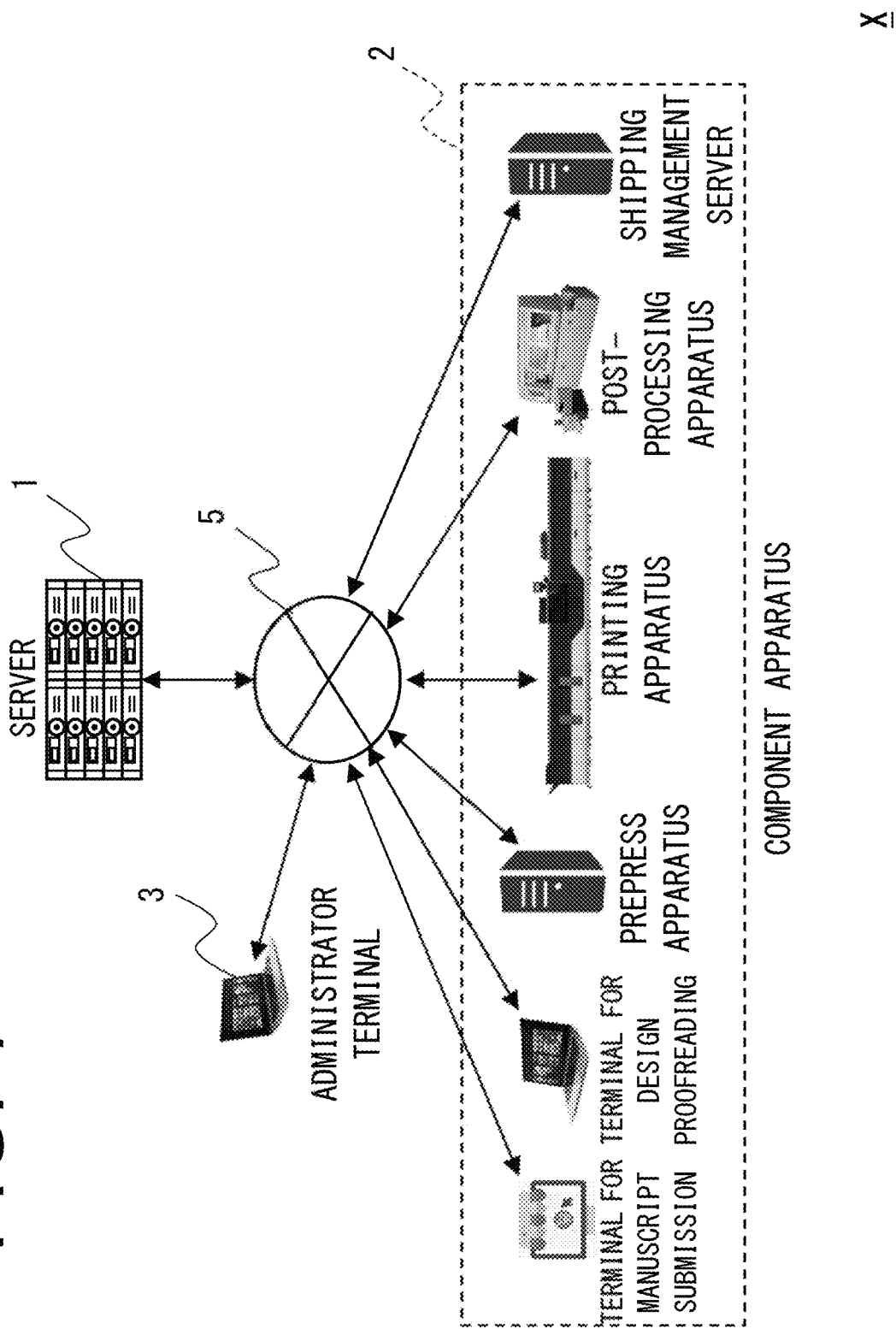
FIG. 1 is a system configuration diagram of a production printing system according to an embodiment of the present disclosure.

Firstly, with reference to FIG. 1, the overall system configuration of the production printing system X according to the present embodiment is described.

The production printing system X according to the present embodiment is a system for performing design and printing in industrial printing (production printing).

Here, in the production printing system X according to the present embodiment, final product such as an output book is called as an "order", and each component of the order is set as a job. In the production printing system X according to the present embodiment, each job for outputting the order is assigned to the component apparatus 2 and managed by a workflow.

The production printing system X according to the present embodiment includes a server 1, a component apparatus 2, and an administrator terminal 3, and each apparatus is connected with a network 5.

The server 1 is a server for designing variable printing in production printing and managing a workflow. The server 1 is a PC (Personal Computer) server, a dedicated apparatus, a general-purpose apparatus, or the like, installed on a so-called cloud or at a user's building.

On this basis, the server 1 designs a variable document by using dedicated design application software (hereinafter, simply referred to as "application"). Further, the server 1 manages a workflow of production printing by executing a printing process management application.

Specifically, the server 1 sends and receives various instructions and information to and from the component apparatus 2 of each process, and requests management and processing for the status of each component apparatus 2. At this time, the server 1 sets the dependency relationship between a plurality of the jobs configuring the order by using each template as described later. Then, the server 1 may perform the processing of each configured job according to the dependency. At this time, the server 1 may also be possible to execute processing for unplanned processing such as changes, cancellations, or the like, which is occurred in the order.

In addition, the server 1 may be a server that executes a common platform that manages user management, tenant management, security management, notification service for maintenance, prepress management, storage management of each document, management of printing apparatuses, and the like. The above-mentioned application may be executed on this server.

The component apparatus 2 is a component that executes various jobs of production printing, and it is each apparatus managed by the server 1. The component apparatus 2 includes, for example, a terminal for submission, a terminal for design proofreading, a prepress apparatus, a printing apparatus for production printing, a post-processing apparatus, a shipping management server, and the like. In this embodiment, one of these apparatuses is simply referred to as a component apparatus 2. Among the component apparatuses 2, each terminal or server can be connected to the server 1 via a web browser such as a PC or smartphone, a dedicated application, or the like.

The administrator terminal 3 is a terminal of the administrator of the printing process. The administrator terminal 3 allows the administrator to access the server 1 to design a variable document by GUI, check the progress status, and request processing.

Figure 2:
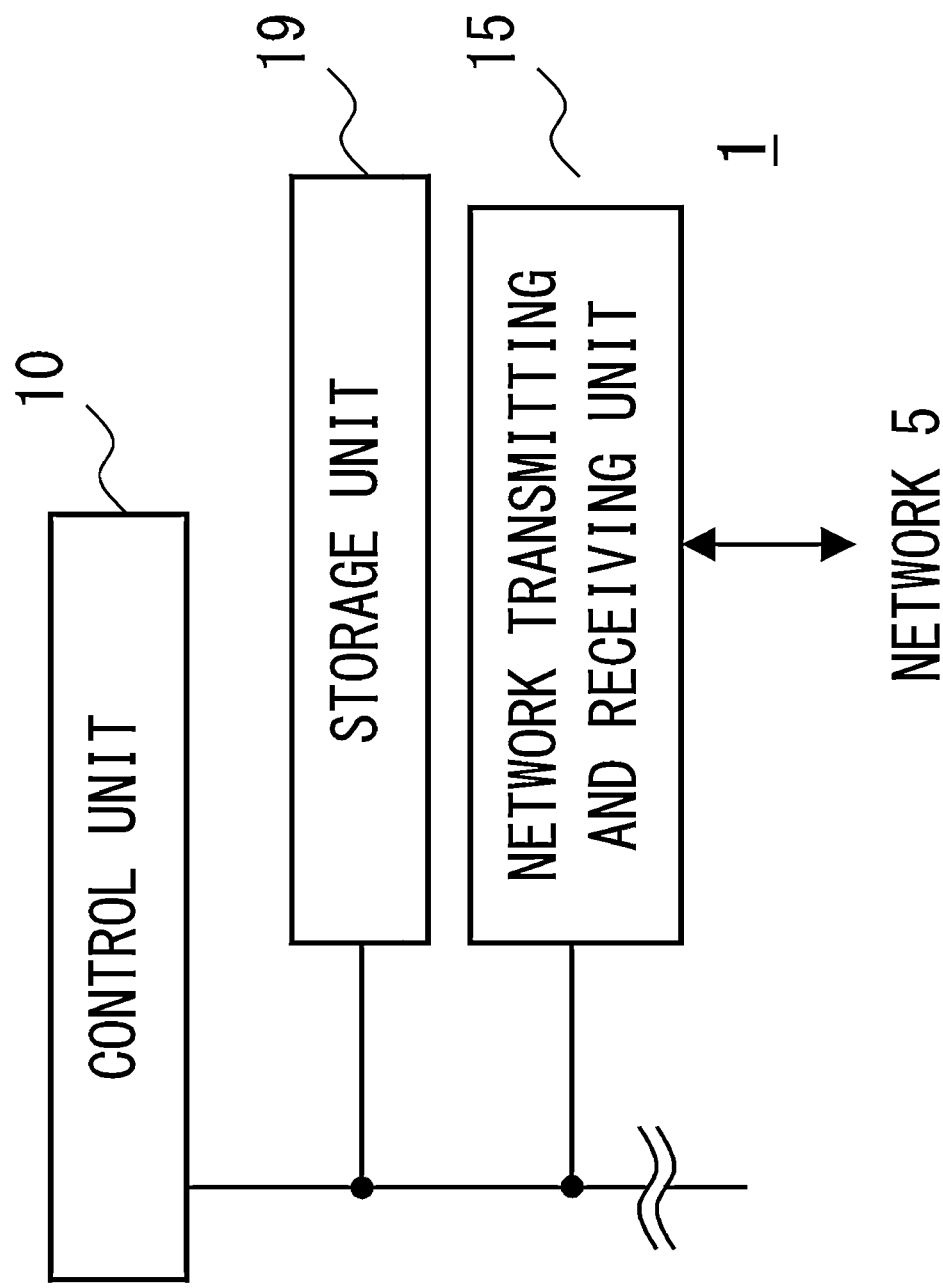
FIG. 2 is a block diagram showing the control configuration of the server as shown in FIG. 1.

Then, with reference to FIG. 2, the control configuration of the server 1 is described.

The server 1 includes a control unit 10, a network transmitting and receiving unit 15, a storage unit 19, and the like. Each unit is connected to the control unit 10 and its operation is controlled by the control unit 10.

The control unit 10 is an information processing unit such as a GPP (General Purpose Processor), a CPU (Central Processing Unit), an MPU (Micro Processing Unit), a DSP (Digital Signal Processor), a GPU (Graphics Processing Unit), and an ASIC (Application Specific Integrated Circuit, a processor for a specific application), or the like.

The control unit 10 reads a control program stored in a ROM or HDD of the storage unit 19, expands the control program in the RAM, and executes the control program, so that the control unit 10 can be operated as each part of the functional block as described later. Further, the control unit 10 controls the entire apparatus according to the instruction information input from the administrator terminal 3 or a console.

The network transmitting and receiving unit 15 is a network connection unit including a LAN board, a wireless transmitter/receiver, and the like, for connecting to the network 5. The network 5 of the present embodiment is, for example, a LAN (Local Area Network), Wi-Fi, WAN (Wide Area Network), a mobile phone network, a voice telephone network, or the like.

The network transmitting and receiving unit 15 transmits/receives data on a data communication line, and transmits/receives a voice signal on a voice telephone line.

The storage unit 19 is a non-temporary recording medium such as a semiconductor memory such as a ROM (Read Only Memory) or a RAM (Random Access Memory) or an HDD (Hard Disk Drive).

The control program for controlling the operation of the server 1 is stored in the ROM or HDD of the storage unit 19. The control program includes an OS (Operating System), middleware on the OS, services (daemons), various applications, database data, and the like. Among these, various applications include the above-mentioned printing process management application.

In addition to this, the storage unit 19 also stores the account settings of the user and the administrator of the production printing system X. Further, a storage area for each user may be set in the storage unit 19.

In addition, in the server 1, the control unit 10 may be integrally formed such as a GPU built-in CPU, a chip-on-module package, an SOC (System On a Chip), or the like.

Further, the control unit 10 may have a built-in RAM, ROM, flash memory, or the like.

[Functional Configuration of Server 1]

Figure 3:
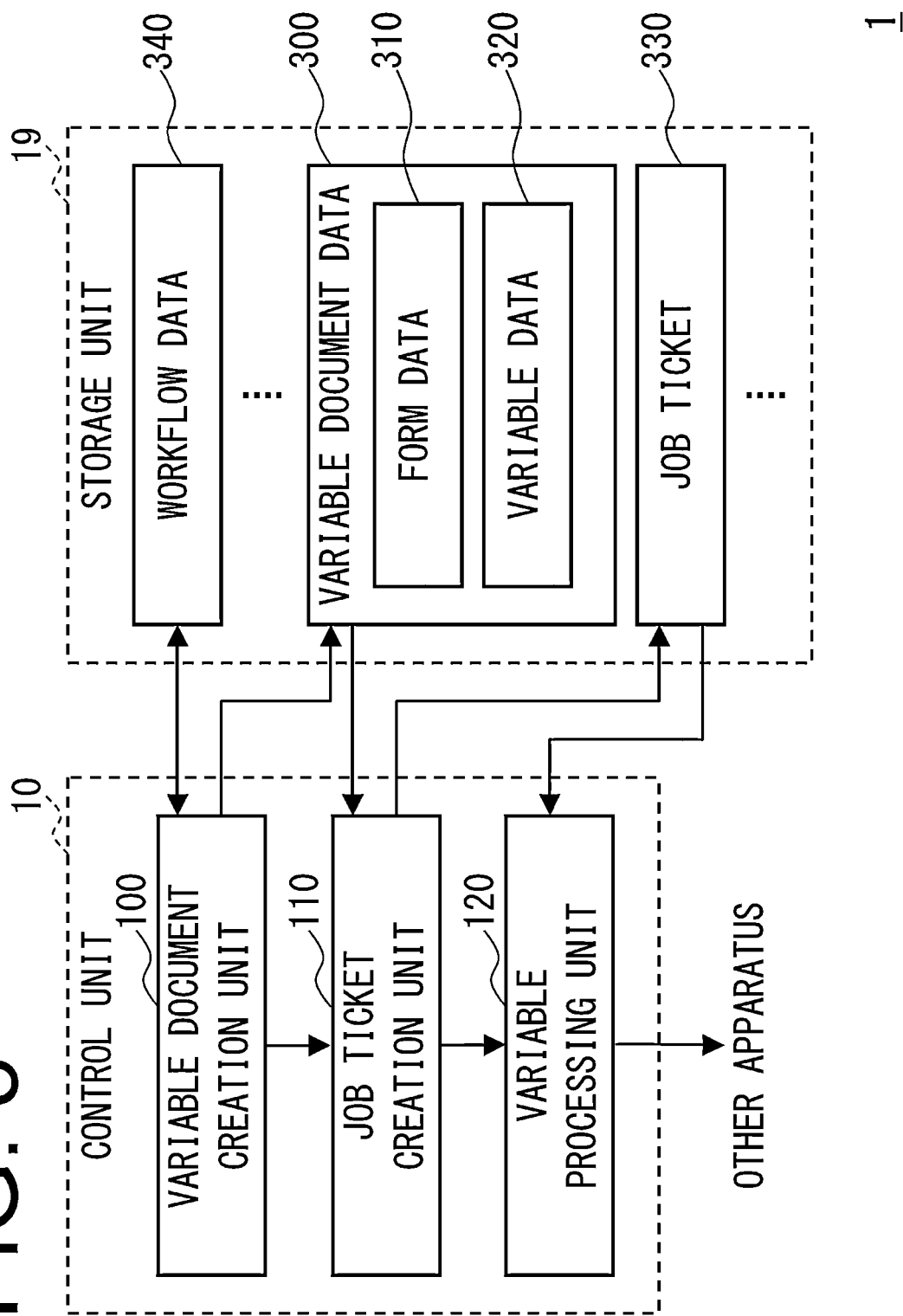
FIG. 3 is a block diagram showing a functional configuration of a production printing system according to an embodiment of the present disclosure.

Here, with reference to FIG. 3, the functional configuration of the server 1 of the production printing system X according to the present embodiment is described.

The control unit 10 of the server 1 includes a variable document creation unit 100, a job ticket creation unit 110, and a variable processing unit 120.

The storage unit 19 stores the variable document data 300, the job ticket 330, and the workflow data 340.

The variable document creation unit 100 creates a variable document in which condition is set for each record.

In the present embodiment, the variable document creation unit 100 provides a GUI (Graphical User Interface) by a design application. As a result, the variable document creation unit 100 designs the variable document data 300.

In the present embodiment, the variable document creation unit 100 can create a variable document by using the set template.

At this time, the variable document creation unit 100 may specify a condition to be set in the variable data 320 with the output attribute of the record as the condition.

The job ticket creation unit 110 creates a job ticket 330 that specifies prepress, printing, post-processing, and output destination according to the condition set for each record of the variable document created by the variable document creation unit 100.

In the present embodiment, the job ticket creation unit 110 may collectively change the settings according to the output attributes set by the variable document creation unit 100.

The variable processing unit 120 processes with the job ticket 330 created by the job ticket creation unit 110.

In the present embodiment, the variable processing unit 120 causes the component apparatus 2 to execute each processing according to the job ticket 330. This process includes prepress, printing, post-processing, and other processing.

In the present embodiment, at this time, the variable processing unit 120 may set the output destination to any one or any combination of the print output, the e-mail output, and the electronic document output, depending on the condition.

In addition, the variable processing unit 120 may change the settings of any one or any combination of imposition, document size, scaling, selecting page, and data conversion in the prepress, depending on the condition.

The variable processing unit 120 sets the output destination and the prepress by the above-mentioned job ticket 330.

The variable document data 300 is a file, a database, or the like, which collects variable documents used at the time of variable printing and various data related thereto.

The variable document data 300 may be described in, for example, JDF (Job Description Format) and/or JMF (Job Messaging Format).

In the present embodiment, the variable document data 300 includes form data 310 including a common form, and the like, used in variable printing, and variable data 320 where printing changes for each copy. These data may be included in the variable document data 300 as attribute data.

The form data 310 is data including a common form, or the like, for performing variable printing. The form data 310 basically does not change at the time of printing. The form data 310 may be, for example, data such as PDF (Portable Document Format), PDL (Page Description Language), and PPML (Personalized Print Markup Language) of XML (Extensible Markup Language) format. Among these, the PDF may be PDF/X, which is a subset of the standard PDF defined by the International Organization for Standardization (ISO15930), a simpler PDF, or the like.

Further, the form data 310 may include image data such as jpg, gif, BMP, PNG, TIFF, or the like, other document data, and other type data. In addition, the form data 310 may include layout information that defines the layout on the page, and the like. The layout information may include format information such as position (coordinates) on the page of the form, size, font size of variable data 320, left alignment, center alignment, right alignment, and the like. Further, the form data 310 may include data for explaining the definition and items of the variable data 320.

The variable data 320 is data for variable output for changing the print content at the time of printing. The variable data 320 may be embedded in the variable document data 300, for example, in a tabular format including a plurality of records, a database format such as XML, or the like.

Alternatively, the variable data 320 may be separately added as a file in a format that is easy to handle as a database. In this case, the variable data 320 may be a database such as a tab-separated or comma-separated file, a spreadsheet application file, another type of database file, a list file, or the like.

In the present embodiment, each record of the variable data 320 has various attributes set in a plurality of items, and it may include data related to condition specification.

The job ticket 330 is job data for causing the server 1 or each component apparatus 2 to execute a process corresponding to the condition item of each record included in the variable data 320 of the created variable document data 300. The job ticket 330 may be described in JDF (Job Description Format) and/or JMF (Job Messaging Format) as attribute data of processing, for example.

In the present embodiment, the job ticket 330 is designated for prepress, printing, post-processing, and an output destination according to condition, and commands, data, and the like, to be transmitted to the output destination are set.

In addition, the job ticket 330 may include data created by the prepress process, correction contents from the workflow, processing results by offset printing, and the like. Further, the job ticket 330 may also include information changed according to the prepress process or the post process.

The workflow data 340 is data for setting a workflow for creating an order, which is a final product, by combining job templates.

In the present embodiment, the workflow data 340 includes specified data (hereinafter, referred to as "template") for specifying condition for each record of the variable data 320 in order to perform variable printing by the variable document data 300. This template includes settings for what kind of job ticket 330 is generated according to the condition set for each record of the variable data 320.

Here, the control unit 10 of the server 1 is made to function as the variable document creation unit 100, the job ticket creation unit 110, and the variable processing unit 120 by executing the control program stored in the storage unit 19.

Further, each part of the server 1 described above becomes a hardware resource for executing the image forming method of the present disclosure.

In addition, apart or any combination of the above-mentioned functional configurations may be configured in terms of hardware or circuit by using IC, programmable logic, FPGA (Field-Programmable Gate Array), or the like.

[Variable Data Process by Production Printing System X]

Next, with reference to FIGS. 4 to 7, variable data process by the production printing system X according to the embodiment of the present disclosure is described.

In the variable data process according to the present embodiment, firstly, variable document data 300 in which the condition is set for each record is created. Then, according to the condition set for each record of the variable data 320 of the created variable document data 300, the job ticket 330 that specifies the prepress, printing, post-processing, and output destination is created. After that, variable processing is performed by the created job ticket 330.

In the variable data process according to the present embodiment, the control unit 10 of the server 1 mainly executes the control program stored in the storage unit 19 in cooperation with each unit and uses the hardware resources.

Figure 4:
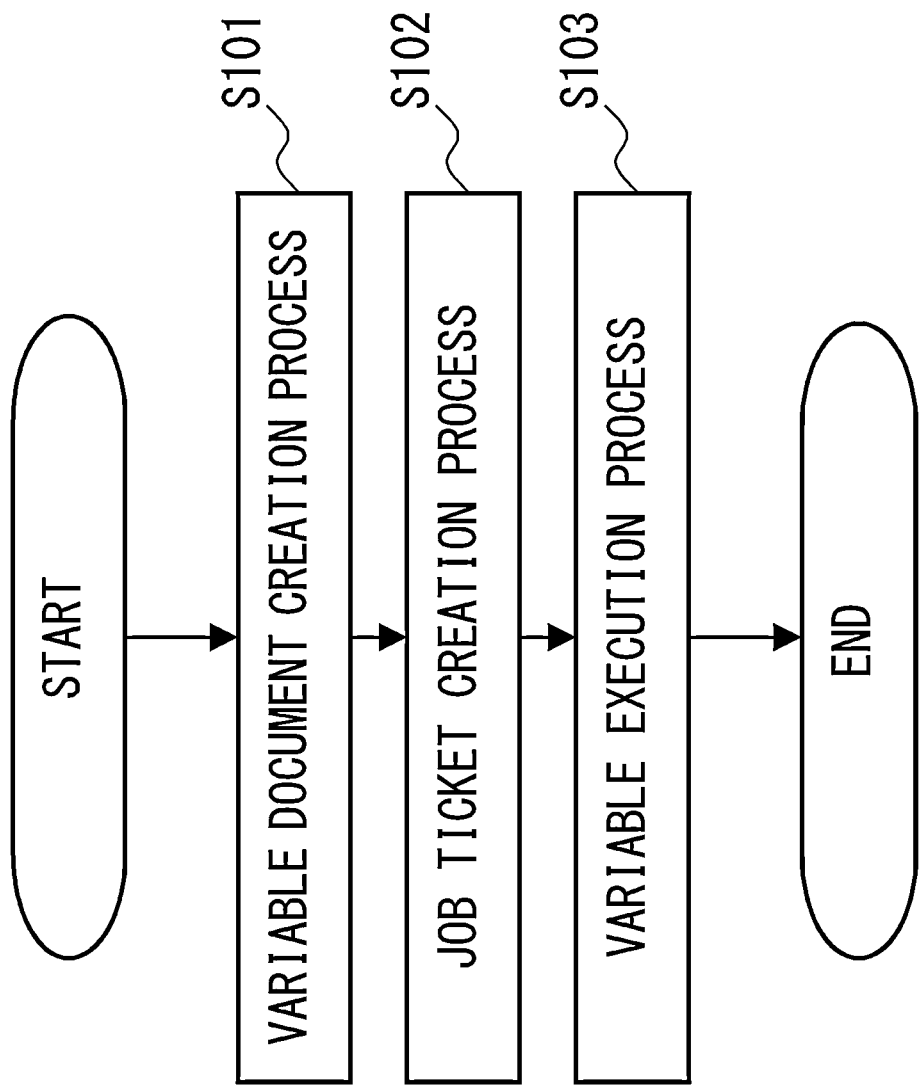
FIG. 4 is a flowchart of variable data process according to the embodiment of the present disclosure.

In the following, with reference to the flowchart of FIG. 4, the details of the processing by the server 1 is mainly described step by step.

(Step S101)

Firstly, the variable document creation unit 100 performs a variable document creation process.

The variable document creation unit 100 creates a variable document in which condition is set for each record.

Specifically, the variable document creation unit 100 creates a variable document by using a template included in the workflow data 340.

At this time, the variable document creation unit 100 can first set the output attribute of the record as a condition.

Further, the variable document creation unit 100 can perform a condition specification for specifying a condition for each record of the variable data 320 included in the variable document data 300. Specifically, in the present embodiment, the variable document creation unit 100 can set the prepress, printing, post-processing, and output destination by specifying the condition for each record. This makes it possible to create a wide variety of variable documents.

More specifically, the variable document creation unit 100 can specify the condition for the prepress process on the condition of the value of each record. In this case, it is possible to specify condition for prepress settings such as imposition, document size, scaling, or the like.

Alternatively, the variable document creation unit 100 can also specify the condition of the selecting page. For example, when finishing as a simplified version, it is possible to select only a specific page, and in the case of a full version, it is possible to specify all pages.

Further, the variable document creation unit 100 can also specify the condition for data conversion. For example, in the case of print output, it is possible to specify conversion to PDF/X, in the case of e-mail output, it is possible to specify conversion to low-resolution simple PDF, and the like.

Furthermore, the variable document creation unit 100 can also select a preset-defined prepress setting from the template.

In addition, the variable document creation unit 100 can specify the imposition, which is different for each record, as a condition by the value of each record. For example, it is possible to add text, images, barcodes, or the like, as the variable content to the pamphlet manuscript to perform personalized imposition.

Further, the variable document creation unit 100 can specify print attributes such as color designation such as paper and ICC profile as a condition by the value of each record.

In addition, as regarding the specification of post-processing, the variable document creation unit 100 can specify post-processing such as finishing as a condition by the value of each record.

Figure 5:
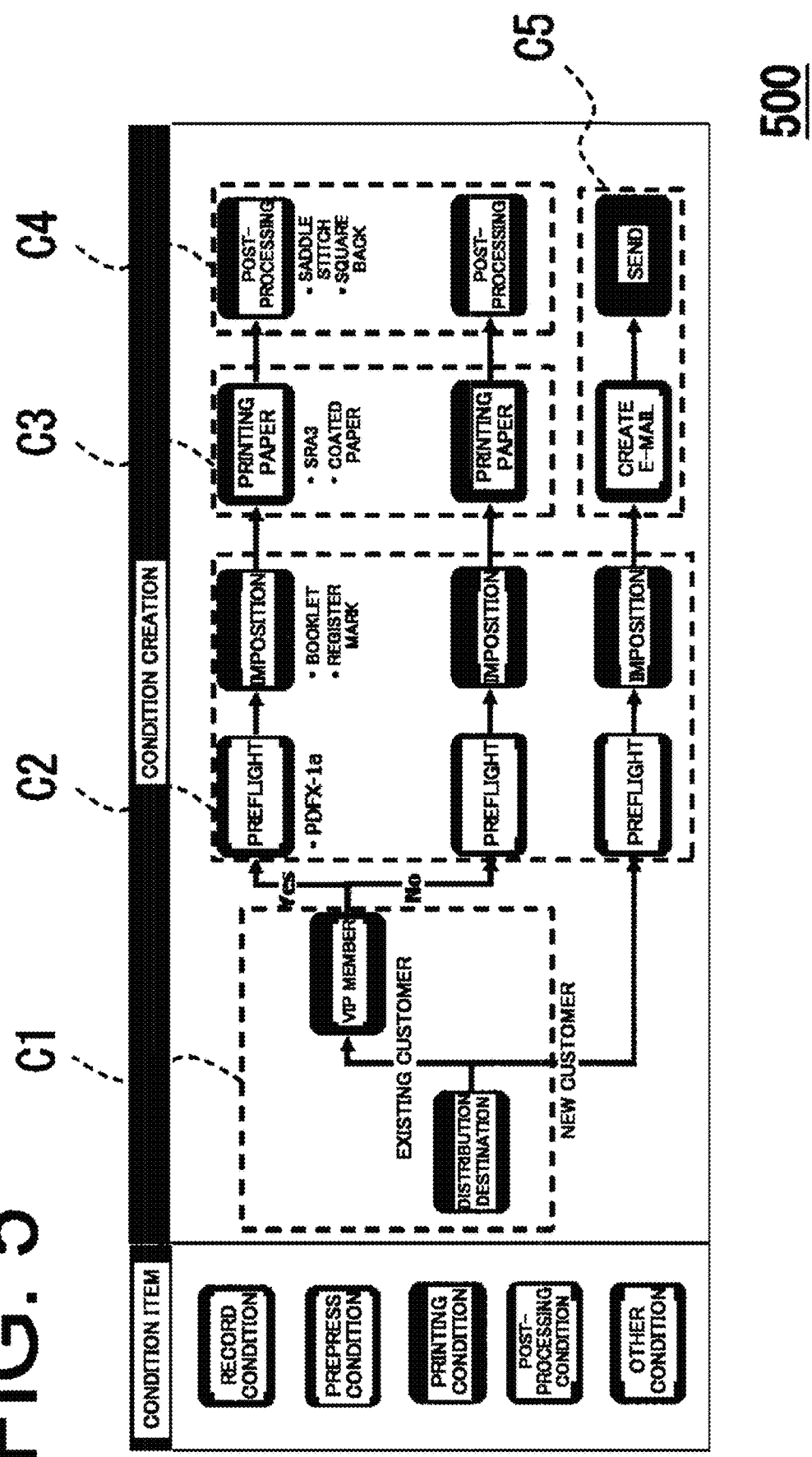
FIG. 5 is an example of a template in the variable data process as shown in FIG. 4.

With reference to the screen example 500 of FIG. 5, a specific example of actually specifying a condition by using a template in the GUI when creating this variable document is described.

In the present embodiment, it is possible to select a template and specify each condition item for each record of variable data 320 with a GUI such as the screen example 500.

Specifically, as shown in C1 of the screen example 500, as the output attribute of the record, the attribute corresponding to the type of each record can be specified as the "record condition". In this example, "new customer" or "existing customer" is specified as the output attribute. In addition, as an output attribute subordinate to the "existing customer", the condition of "VIP member" among the existing customers is specified.

Then, for each "record condition", the "prepress condition" as shown in C2 is specified. In this example, in the case of a condition of "VIP member" among the "existing customer", for example, using the format of "PCFX-1a" for "Preflight", booklet imposition (Booklet) for the "imposition", and adding the register mark are specified.

On the other hand, in the case of a condition that even an "existing customer" is not a "VIP member" (hereinafter referred to as "regular member"), although using the normal PDF format for "Preflight", a booklet imposition for "imposition", and adding the register mark, the simple printing is specified Furthermore, in the case of a condition of not being an existing customer, using a low-resolution converted image data format such as simple PDF, jpg, or the like, for "Preflight", imposition for each page for "imposition", and not adding register mark are specified.

Further, as the "printing condition" as shown in C3, as for the condition of "VIP member" of "existing customer", the size of "printing paper" is set to SRA3, and coated paper is specified.

On the other hand, regarding the condition of "regular member" in "existing customer", it is specified that plain paper is used while the size of "printing paper" remains SRA3.

Further, as the "post-processing condition" as shown in C4, as for the condition of "VIP member" of the "existing customer", the "post-processing" is closed in the middle and the corner spine finish is specified.

On the other hand, regarding the condition of "regular member" in "existing customer", "post-processing" is specified as only middle closing.

As described above, as a condition specification, regarding the condition of a record where the distribution destination is the existing customer, although it is a print output, to make a difference in printing and post-processing between "VIP member" and "normal member" can be done.

Then, the record of the new customer to be distributed is output as a digital document by e-mail.

In such a case, "Create E-mail" and "Send" are specified as in "Other condition" as shown in C5.

As in these examples, by specifying the condition by using the template, the prepress, printing, post-processing, and output destination can be set.

In addition, as a condition setting by using the above template, it is also possible to simplify the prepress specification by defining a plurality of prepress settings as a preset. For example, it is possible to prepare the prepress setting targeting for creating applications such as prepress settings for direct mail, or the like. Further, it is possible to the prepare setting for a specific customer such as "product pamphlet for Mr. XX", or the like.

Furthermore, the variable document creation unit 100 makes it possible to use the setting in common for specifying the other condition by using the template. That is, it can be used in the similar way as the "class" of an object-oriented language.

The template can also be shared. That is, it may be possible to centrally manage setting management such as changes, or the like. This may be done in the same way as using an instance of an object-oriented language "class" globally.

In addition, the variable document creation unit 100 can also create the template itself by using the GUI.

Further, the variable document creation unit 100 can directly specify by JDF and/or JMF, that is, programmatic description by using a so-called "macro" language, or the like, in addition to setting condition by using GUI.

(Step S102)

Next, the job ticket creation unit 110 performs a job ticket creation process.

The job ticket creation unit 110 processes each record according to the condition set for each record of the variable data 320 of the variable document data 300. In the present embodiment, the job ticket creation unit 110 creates a job ticket 330 for each record.

As a result, the job ticket creation unit 110 creates a job ticket 330 for which prepress, printing, post-processing, and output destination are specified according to the attributes of the record for each subset.

More specifically, the job ticket creation unit 110 can create a job ticket 330 with print attribute specification based on the condition specification.

That is, as shown in follows, the print attribute is specified on condition that the value included in the record of the variable data 320 is used.

The following is an example of the description of JDF and/or JMF of the job ticket 330 for which the print attribute is specified:

If (Distribution=="Customer" && Customer Type=="Existing" && VIPMember=="Yes") {

Media Type=Coated Paper

Finishing=Booklet

. . .

}

In addition, the job ticket creation unit 110 can also create a job ticket 330 in which print output, e-mail output, electronic document output, or the like, is specified based on the condition specification.

The following is an example of the description of the JDF and/or JMF of the job ticket 330 for which e-mail transmission is specified:

```
If     (Distribution=="Customer"    &&    Customer
Type=="New") {
  Delivery=Email
  ...
}
```

Figure 6:
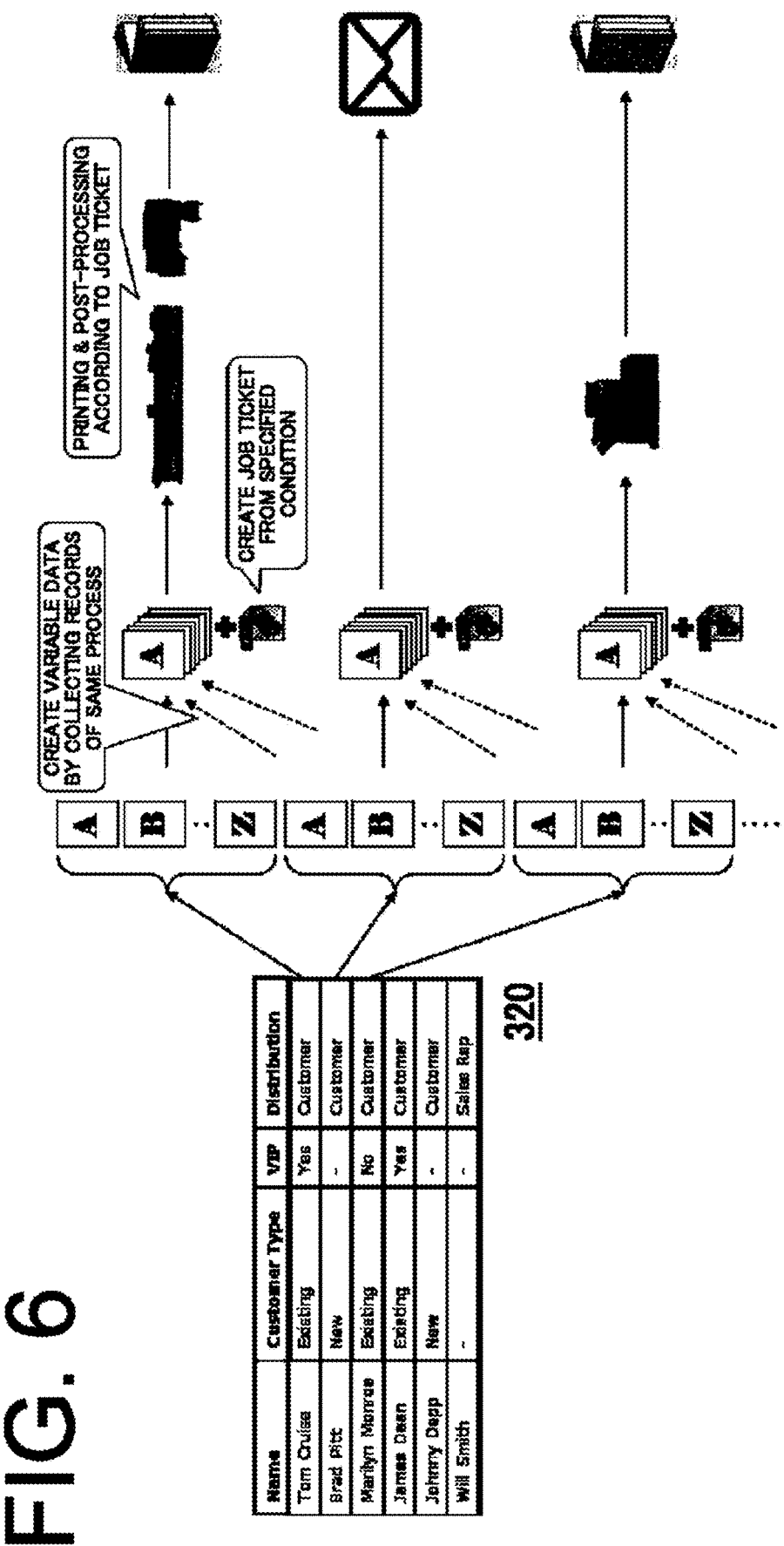
FIG. 6 is a conceptual diagram of the processing of each record in the variable data process as shown in FIG. 4.

As shown in FIG. 6, at this time, the job ticket creation unit 110 collects the records as a subset according to the output attribute, which is set by the variable document creation unit 100. Then, the job ticket creation unit 110 may change the setting for each the subset, collectively, and create a job ticket 330.

In the example of FIG. 6, according to the specification of the condition item of "Distribution" of each record of the variable data 320, for example, data that collects a subset of the same condition is created. In this example, job tickets 330 are created for each subset of "output for VIP members" and "output for normal members" as "variable data for printing". Also, as "variable data for e-mail", a job ticket 330 is created for a subset of "new customer, e-mail only". For each of these subsets, a job ticket 330 may be created for printing, post-processing, e-mail transmission, or simple printing.

(Step S103)

Next, the variable processing unit 120 performs variable execution process.

The variable processing unit 120 performs processing to execute a job on each component apparatus 2 by the job ticket 330 created by the job ticket creation unit 110.

Specifically, the variable processing unit 120 may change setting of any one or any combination of imposition, document size, scaling, selecting page, and data conversion in prepress, depending on the condition set for each record of the variable data 320. In this case, the variable processing unit 120 causes the prepress apparatus of the component apparatus 2 to perform these prepress processes.

Further, the variable processing unit 120 sets and perform processing the output destination to any one or any combination of print output, e-mail output, and electronic document output according to the condition set for each record of the variable data 320. In the case of print output, the variable processing unit 120 causes a production printing apparatus, a post-processing apparatus, a shipping management server, or the like, as the component apparatus 2 to perform processing.

Figure 7:
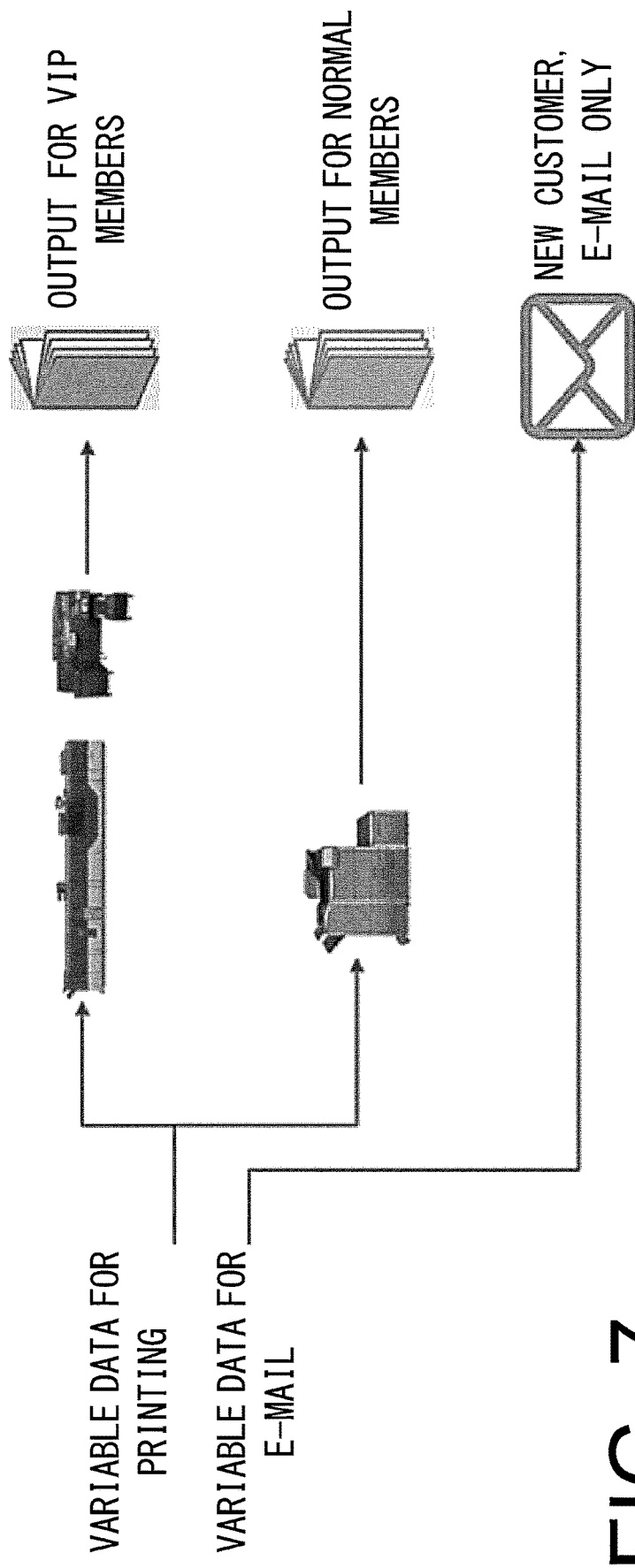
FIG. 7 is a conceptual diagram of job ticket processing in the variable data process as shown in FIG. 4.

In the example of FIG. 7, the variable processing unit 120 performs a post-processing process after printing by the job ticket 330 of the subset "output for VIP members" of the "variable data for printing" according to the conditions of each record of FIGS. 5 and 6 as described above. Further, the variable processing unit 120 performs a process of performing simple printing by using the job ticket 330 of the subset "output for normal members" of the "variable data for printing".

On the other hand, the variable processing unit 120 processes only e-mail transmission of the simple PDF or jpg, or electronic document output by the job ticket 330, which is a subset of the "variable data for e-mail". Here, the variable processing unit 120 may send an e-mail or an electronic document to the e-mail address described as the item of each record of the variable data 320. Alternatively, the variable processing unit 120 may cause the shipping management server of the component apparatus 2 to send an e-mail and manage the e-mail together with the printed output.

As the above, the variable data process according to the embodiment of the present disclosure is completed.

As configured in this way, the following effects can be obtained.

In typical variable printing, the output is changed for each record with the same printer and within a limited range of print attributes such as paper and finishing specifications.

However, in actual production printing, in order to print with different finishes, prepress processing such as imposition, output by another printing apparatus, post-processing by another post-processing machine, or the like are required. For this reason, typical variable printing could not be used.

On the other hand, the production printing system X according to the embodiment of the present disclosure is a production printing system that processes variable data for production printing, including: a variable document creation unit 100 that creates a variable document with a condition set for each record; a job ticket creation unit 110 that creates a job ticket 330 where prepress, printing, post-processing, and output destination is specified according to the condition set for each record of the variable document created by the variable document creation unit 100; and a variable processing unit 120 that performs processing by the job ticket 330 created by the job ticket creation unit 110.

With this configuration, variable printing in production printing can be enabled by expanding the condition specification not only to the design of variable documents but also to prepress, printing, post-processing, and the like. That is, by using the condition specification by the rule not only for the design of the variable document but also for the prepress processing, the post-processing, and the changing of the output destination, the variable document can be processed flexibly. Therefore, it is possible to perform variable printing in an actual production printing system, which is extended to the use of "one-source multi-use".

Further, as an application of variable printing, it has been desired to utilize not only printed matter but also e-mail, electronic document output, or the like, but typical technology cannot cope with it.

On the other hand, in the production printing system X according to the embodiment of the present disclosure, the variable processing unit 120 sets the output destination to any one or any combination of print output, e-mail output, and electronic document output depending on the condition.

With this configuration, it is possible to utilize not only printed matter but also e-mail, electronic document output, and the like. That is, it can be applied to multi-use for outputting e-mails and electronic documents other than printing. Further, for example, it is possible to create one variable document data 300 including various types of data for e-mail, documents, and the like, from one manuscript PDF.

In the production printing system X according to the embodiment of the present disclosure, the variable processing unit 120 changes setting of any one or any combination of imposition, document size, scaling, selecting page, and data conversion in prepress depending on the condition.

With this configuration, in order to print a variable document and create a printed matter, it is possible to perform processing according to not only the design of the variable document but also the specification of prepress processing including imposition, document size, scaling, selecting page, data conversion, or the like. This makes it possible to process a wider variety of variable documents, and to output a wide range of prepresses that match actual work. Further, image conversion for electronic data output can be performed at the time of prepress.

In the production printing system according to the embodiment of the present disclosure, the variable document creation unit 100 sets output attribute of the record as the condition; and the job ticket creation unit 110 collectively changes the setting according to the output attribute set by the variable document creation unit 100.

With this configuration, the job ticket 330 can be set by collecting the records into the subset, or the like. Therefore, the efficiency of the work of putting together the same type can be improved, and the cost such as the transportation cost can be reduced. Furthermore, it is possible to process an appropriate variable document by specifying complicated condition that involves a plurality of records.

In the production printing system according to the embodiment of the present disclosure, the variable document creation unit 100 creates a variable document by using a set template for each of output attribute.

With this configuration, the variable document data 300 for processing required for production printing can easily be created by using the template. Furthermore, the template can be shared or applied to others, and one-source multi-use use of the variable document data 300 can be performed.

Other Embodiments

In the above-described embodiment, an example is described where a job ticket 330 described in JDF and/or JMF is created and each process of the variable document is performed.

However, it may be configured so as not to create JDF and/or JMF. In this case, each apparatus may be directly controlled according to the conditions set in each variable data 320. Further, this control may be performed in the same manner as the job ticket 330.

Furthermore, a job ticket 330 for other processes may be created, such as changing the process for performing inspection after output, or the like.

By configuring in this way, various configurations can be supported.

In addition, in the above-described embodiment, an example of changing the prepress, printing, post-processing, output destination, or the like, with the job ticket 330 according to the condition set in the record has been described.

However, these changes may be made under other condition such as the number of records of the same type, the file type of the record, or the like. Further, when there is a plurality of component apparatuses 2 at the output destination, the apparatuses may be selected by prioritizing them according to the condition. For example, as a process of "record condition", in the case of "VIP member", a printing apparatus having a high resolution, or a large number of inks may be specified. Otherwise, in the case of a "normal member", a printing apparatus having a low printing cost and a normal finish or a digital printing apparatus may be specified.

Further, when the number of records is small or when printing is performed in a small lot, a condition for performing printing only by a digital printing apparatus without using an offset printing apparatus can be specified. Alternatively, although offset printing is not used at the time of prepress, offset printing and digital printing may be used properly at the time of actual printing.

With this configuration, various condition can be set to perform variable printing that is actually required in a production printing system.

Further, in the above-described embodiment, an example by using the set template has been described.

However, the template may be changed depending on the processing result after output. For example, if there are many "VIP members" who wish to send an e-mail according to the results of the questionnaire, the change may be made automatically, such as sending an e-mail at the same time as outputting the printed matter.

Further, the template may be automatically changed in consideration of the change of the processing after the output, the cost, and the like.

With this configuration, variable printing can be performed in a production printing system that is more suitable for the actual situation.

In the above-described embodiment, an example of automatically generating a job ticket 330 by the job ticket creation unit 110 has been described.

However, it may be possible for the user to directly create the job ticket 330 according to the setting of the condition by the variable document creation unit 100.

Further, in the above-described embodiment, an example in which the job ticket 330 is attribute data of processing such as JDF and/or JMF is described. However, the job ticket 330 may also be capable of by using data in a format such as a macro language or a programming language.

Further, in the above-described embodiment, as the production printing, an example of variable printing on a printed matter of paper, sending an e-mail, and outputting an electronic document has been described, but the present disclosure can also be applied to other production printing.

For example, it is also applicable to variable book printing, on-demand printing, and other printing.

Alternatively, it can be used, for example, for split printing of large-format posters, sheet printing for exteriors and interiors of aircraft and automobiles, manufacturing of electronic components such as flat displays and electronic substrates, printing of cultured cells, and the like. In this case, as the component apparatus 2, an industrial inkjet printer, an industrial robot, various reaction apparatuses, a culturing apparatus, and the like, can also be used.

With this configuration, it can be used for various purposes.

Further, in the above-described embodiment, an example in which various processes are performed on the server 1 has been described.

However, it may be configured by using a dedicated terminal for creating variable data 320, by using another server for managing workflows, by performing prepress processing via the administrator terminal 3, by using an e-mail sending server, by using another apparatus for creating and controlling the job ticket 330, or the like.

Further, it is needless to say that the configuration and operation of the above-described embodiment are examples and can be appropriately modified and executed without departing from the aim of the present disclosure.

What is claimed is:

1. A production printing system that processes variable data for production printing, comprising:
a variable document creation unit configured to create a variable document with a condition set for each record of the variable document;
a job ticket creation unit configured to create a job ticket where prepress, printing, post-processing, and output destination is specified according to the condition set for said each record of the variable document created by the variable document creation unit; and a variable processing unit configured to perform processing by the job ticket created by the job ticket creation unit.

2. The production printing system according to claim 1, wherein
the variable processing unit sets the output destination to any one or any combination of print output, e-mail output, and electronic document output depending on the condition.

3. The production printing system according to claim 1, wherein
the variable processing unit changes setting of any one or any combination of imposition, document size, scaling, selecting page, and data conversion in the prepress depending on the condition.

4. The production printing system according to claim 1, wherein
the variable document creation unit sets output attribute of the record as the condition; and
the job ticket creation unit collectively changes the setting according to the output attribute set by the variable document creation unit.

5. The production printing system according to claim 4, wherein
the variable document creation unit creates the variable document by using a set template for each of the output attribute.

6. A server for production printing systems that process variable data for production printing, comprising:
a variable document creation unit configured to create a variable document with a condition set for each record of the variable document;
a job ticket creation unit configured to create a job ticket where prepress, printing, post-processing, and output destination is specified according to the condition set for said each record of the variable document created by the variable document creation unit; and
a variable processing unit configured to perform processing by the job ticket created by the job ticket creation unit.

7. The server according to claim 6, wherein
the variable processing unit sets the output destination to any one or any combination of print output, e-mail output, and electronic document output depending on the condition.

8. The server according to claim 6, wherein
the variable processing unit changes setting of any one or any combination of imposition, document size, scaling, selecting page, and data conversion in the prepress depending on the condition.

9. The server according to claim 6, wherein
the variable document creation unit sets output attribute of the record as the condition; and
the job ticket creation unit collectively changes the setting according to the output attribute set by the variable document creation unit.

10. The server according to claim 9, wherein
the variable document creation unit creates the variable document by using a set template for each of the output attribute.

11. A variable printing method performed by a server of a production printing system that processes variable data for production printing, comprising the steps of:
creating a variable document with a condition set for each record of the variable document;
creating a job ticket where prepress, printing, post-processing, and output destination is specified according to the condition set for each the record of created variable document; and
processing the job by the job ticket that is created.

12. The variable printing method according to claim 11, comprising
setting the output destination to any one or any combination of print output, e-mail output, and electronic document output depending on the condition.

13. The variable printing method according to claim 11, comprising
changing setting of any one or any combination of imposition, document size, scaling, selecting page, and data conversion in the prepress depending on the condition.

14. The variable printing method according to claim 11, comprising
setting output attribute of the record as the condition; and
collectively-changing the setting according to the output attribute that is set.

15. The variable printing method according to claim 14, comprising
creating the variable document by using a set template for each of the output attribute.

* * * * *